J. SPADAFORA.
TRANSMISSION GEARING.
APPLICATION FILED OCT. 24, 1919.

1,341,392.

Patented May 25, 1920.
2 SHEETS—SHEET 1.

Inventor.
Joseph Spadafora
by Heard Smith & Tennant.
Attys.

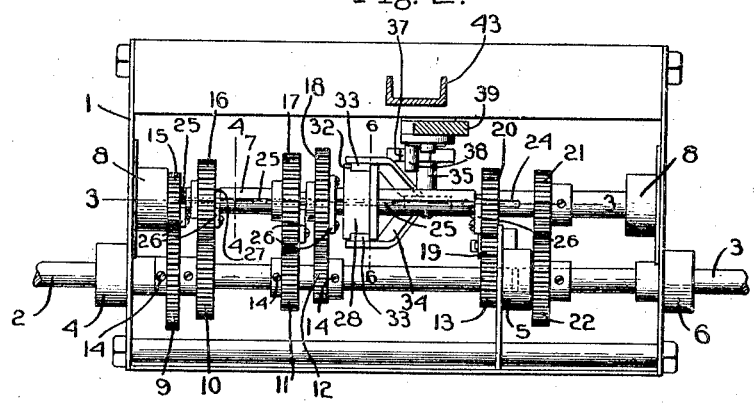
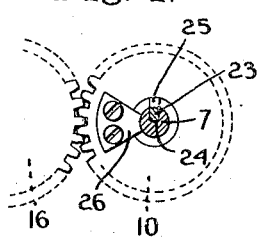
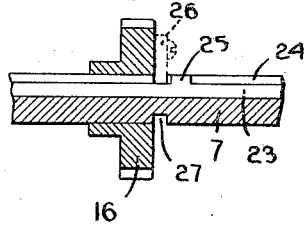
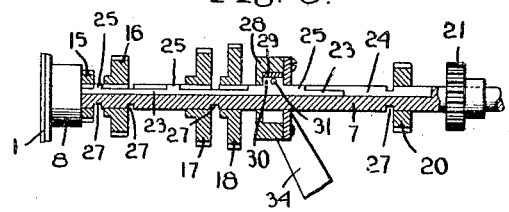
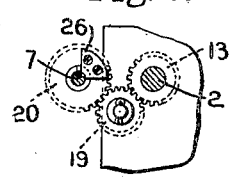
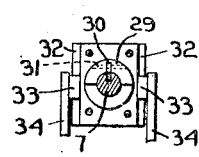

UNITED STATES PATENT OFFICE.

JOSEPH SPADAFORA, OF CAMBRIDGE, MASSACHUSETTS.

TRANSMISSION-GEARING.

1,341,392.  Specification of Letters Patent.  Patented May 25, 1920.

Application filed October 24, 1919. Serial No. 332,885.

*To all whom it may concern:*

Be it known that I, JOSEPH SPADAFORA, a subject of the King of Italy, residing at Cambridge, county of Middlesex, State of Massachusetts, have invented an Improvement in Transmission-Gearing, of which the following description, in connection with the accompanying drawing, is a specification, like characters on the drawing representing like parts.

This invention relates to transmission gearing of the sliding key type by which is meant a transmission gearing in which the different gears are thrown into operation by a key slidable longitudinally of the shaft and adapted to connect any one of the gears to the shaft according to the speed desired.

The object of the invention is to provide an improved transmission gearing of this type which has various novel features that will be more fully hereinafter described.

In order to give an understanding of my invention, I have illustrated in the drawings a selected embodiment thereof which will now be described, after which the novel features will be pointed out in the appended claims.

In the drawings Figure 1 is a side view of a transmission gearing embodying my invention;

Fig. 2 is a section on the line 2—2, Fig. 1, with the cover of the transmission casing removed to show the arrangement of gearing;

Fig. 3 is a section on the line 3—3, Fig. 2;

Fig. 4 is an enlarged section on the line 4—4, Fig. 2;

Fig. 5 is an enlarged section on a portion of the line 3—3, Fig. 2;

Fig. 6 is a section on the line 6—6, Fig 2;

Fig. 7 shows the reverse gear.

Figure 1:
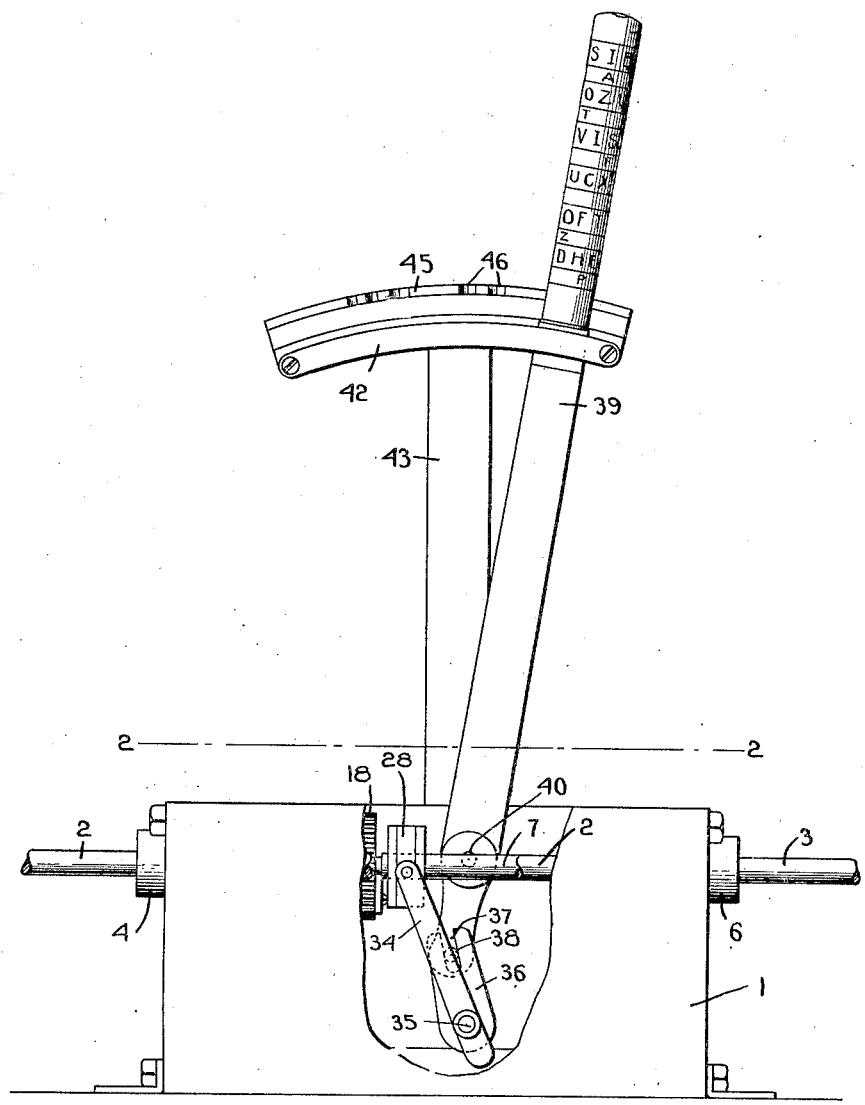

1 indicates the transmission gear casing in which the gears are received. 2 is a driving shaft which is connected to and driven by the motor, and 3 indicates the driven shaft which is driven from the driving shaft 2 through the transmission gearing and which, in the case of an automobile, leads to the differential gearing. In my invention the driving shaft and the driven shaft are in alinement with each other. The driving shaft is shown as journaled in suitable bearings 4 and 5 carried by the transmission casing and the driven shaft is journaled in bearings 6 and also in the bearing 5.

The power is transmitted from the driving shaft 2 to the driven shaft 3 through an intermediate shaft 7 herein shown as journaled in bearings 8 formed in the transmission casing 1. The driving shaft 2 has fast thereon a plurality of gears of different sizes, depending upon the number of speeds desired. In the present embodiment of my invention, the transmission gearing is designed to give four different speeds forward and one speed reverse and, therefore, the driving shaft 2 has fast thereon the five gears, 9, 10, 11, 12 and 13. All the gears are made fast to the shaft 2 in any suitable way as by means of set screws 14. The gears 9, 10, 11 and 12 mesh with other gears 15, 16, 17 and 18 which are loosely mounted on the shaft 7, said gears being constantly in mesh with each other at all times.

The gear 13, which is the reverse gear, meshes with an intermediate gear 19, and the gear 19 meshes continually with a gear 20 also loose on the shaft 7. The shaft 7 has a gear 21 fast thereon which constantly meshes with a gear 22 fast on the driven shaft 3.

As stated above gears 15, 16, 17, 18 and 20 are normally loose on the shaft 7 and a sliding key arrangement is provided by which any one of these gears may be coupled to the shaft 7, depending on the speed at which it is desired to drive the driven shaft 3. This sliding key is shown at 23 and it is slidably mounted in a groove 24 formed in the shaft 7. This key 23 has a plurality of driving projections 25 thereon which by movement of the key are brought into operative driving connection with the various gears on the shaft 7. Each gear on the shaft 7 has a block 26 fast to one face thereof and the shaft 7 has adjacent each gear an annular groove 27 into which the inner end of the block 26 is received. The block 26 by operating in the groove 27 thus acts to hold the gear in proper position longitudinally of the shaft 7 while permiting the gear to freely rotate relative to the shaft.

The projections 25 on the sliding key 23 are of such dimensions as to be received entirely within the groove 24, so that these projections are free to slide through the various gears 15, 16, 17, 18 and 20 on the shaft 7. When, however, the key is positioned so that a projection 25 thereon comes opposite a groove 27 in the shaft, then said projection will engage the inner end of the block 26 on said gear, thus coupling the gear to the shaft.

The projections 25 on the key 23 are so positioned relative to the gears 15, 16, 17, 18 and 20 that in one position of said key all the gears are disconnected from the shaft, while in another position the gear 18 is connected and all the other gears will be loose; in another position the gear 17 will be connected and all the other gears will be loose; and still another position the gear 16 will be connected and all the others will be loose; and still another position the gear 15 will be connected and all the others will be loose, while in a fifth position the gear 20 will be connected and all the others will be loose. Hence by shifting the key 23 into different positions the shaft 2 may be coupled to the shaft 7 through any one of the gears 15, 16, 17, 18 or 20.

The gears are so proportioned that when the gear 18 is coupled to the shaft 7 the driven shaft will be operated at low speed, while when the gear 17 is coupled to the shaft the driven shaft will be operated at second speed; when the gear 16 is connected to the shaft the driven shaft will be operated at third speed; when the gear 15 is connected the shaft will be operated at high speed, and when the gear 20 is connected the shaft will be rotated in a reverse direction.

Any suitable means for shifting the key 23 may be employed. I have herein shown for this purpose a housing 28 which is slidably mounted on the shaft 7 and which has rotatably mounted therein a collar 29 that is connected to the key 23. For this purpose the key is provided with a projection 30 which extends into a recess in the collar and is anchored thereto by the pin 31. As the shaft 7 rotates the collar 29 will rotate within the housing 28, but by moving the housing longitudinally of the shaft, the key will be given a similar longitudinal movement. This housing is provided with grooves 32 in its opposite sides in which is received projections 33 on the upper end of a forked arm 34 which is fast on a rock shaft 35. This rock shaft has another arm 36 fast thereto provided with a slot 37 in its upper end, and this slot receives a pin 38 extending from the lower end of a control lever 39 pivoted to the transmission casing at 40. The upper end of the control lever operates in a guiding slot formed between two guide bars 42 that are carried by the upper end of a standard 43 rising from the transmission casing. This control lever has a spring-pressed positioning pin (not shown) extending laterally therefrom which is adapted to engage in notches 46 formed in a quadrant 45, said notches operating to hold the control lever in different positions corresponding to different speeds.

An advantage resulting from the use of the blocks 26 is that it makes it easier to couple any gear to the shaft 7 for the key 23 is free to move to bring the projection 25 thereon into line with the block 26 at any time except when the gear is in such position that the block 26 intersects the keyway 24, and as this occurs only during a portion of each rotation of the gear there is no difficulty in shifting the key rapidly while the gears are running.

I claim:

1. In transmission gearing, the combination with a driving shaft, of a plurality of gears of different sizes fast thereon, a second shaft having a keyway extending longitudinally thereof, a plurality of driven gears loosely mounted on said second shaft and meshing with the gears on the driving shaft, said second shaft having an annular groove therein adjacent each gear thereon, a projection extending from each driven gear into the adjacent groove in said second shaft, and a key slidable in said keyway and adapted to be brought into operative driving connection with the various projections.

2. In transmission gearing, the combination with a driving shaft, of a plurality of gears of different sizes fast thereon, a second shaft having a keyway extending longitudinally thereof, a plurality of driven gears loosely mounted on said second shaft and meshing with the gears on the driving shaft, a block secured to each gear on the second shaft and having a portion operating in the corresponding groove in said shaft, and a key slidable in the keyway and adapted to be brought into operative driving connection with the various blocks.

3. In transmission gearing, the combination with a driving shaft, of a plurality of gears of different sizes fast thereon, a driven shaft in line with the driving shaft, an intermediate shaft having a keyway extending longitudinally thereof, a plurality of driven gears loosely mounted on said intermediate shaft and meshing with the gears on the driving shaft, said intermediate shaft having an annular groove therein adjacent each gear thereon, a projection extending from each driven gear into the adjacent groove in the second shaft, a key slidable in the keyway and adapted to be brought into operative driving connection with the various projections, and gearing connecting the intermediate shaft with the driven shaft.

In testimony whereof I have signed my name to this specification.

JOSEPH SPADAFORA.